(12) United States Patent
Schwuchow

(10) Patent No.: US 9,879,952 B2
(45) Date of Patent: Jan. 30, 2018

(54) IGNITER CARRIER, IGNITER UNIT AND METHOD FOR PRODUCING AN IGNITER UNIT

(71) Applicant: Karsten Schwuchow, Wasserburg am Inn (DE)

(72) Inventor: Karsten Schwuchow, Wasserburg am Inn (DE)

(*) Notice: Subject to any disclaimer, the term of this patent is extended or adjusted under 35 U.S.C. 154(b) by 190 days.

(21) Appl. No.: 14/429,542

(22) PCT Filed: Sep. 20, 2013

(86) PCT No.: PCT/EP2013/069640
§ 371 (c)(1),
(2) Date: May 22, 2015

(87) PCT Pub. No.: WO2014/044830
PCT Pub. Date: Mar. 27, 2014

(65) Prior Publication Data
US 2016/0169640 A1 Jun. 16, 2016

(30) Foreign Application Priority Data
Sep. 21, 2012 (DE) .................. 10 2012 217 070

(51) Int. Cl.
*F42B 3/26* (2006.01)
*B60R 21/26* (2011.01)
*B23P 19/00* (2006.01)

(52) U.S. Cl.
CPC ............ *F42B 3/26* (2013.01); *B23P 19/00* (2013.01); *B60R 21/26* (2013.01);
(Continued)

(58) Field of Classification Search
CPC ......... B60R 21/26; B60R 2021/26029; B60R 2021/26076; B60R 2021/26082; B60R 2021/26088; B23P 19/00; F42B 3/26
See application file for complete search history.

(56) References Cited

U.S. PATENT DOCUMENTS 5,054,395 A * 10/1991 Vetter ................... F41A 19/69
102/202.2
6,073,963 A * 6/2000 Hamilton ............... B60R 21/26
102/202.14
(Continued)

FOREIGN PATENT DOCUMENTS

AT 006034 3/2003
DE 202004011078 9/2004
(Continued)

*Primary Examiner* — Drew J Brown
(74) *Attorney, Agent, or Firm* — Davidson, Davidson & Kappel, LLC

(57) ABSTRACT

An igniter carrier (4) for an igniter unit (1), particularly for a gas generator, including a first receptacle section (8) for an igniter (2), a second receptacle section (9) and a connecting section (7) for attaching the igniter unit (1), wherein the igniter carrier (4) is prefabricated from a plurality of individual parts joined together and can be assembled in an assembly process as an individual part (4) of an assembly (1) together with an igniter (2) and a connector part (3) is provided. An igniter unit (1), particular for a gas generator, including such an igniter carrier (4), to an igniter (2) and to a method for producing such an igniter unit (1) is provided.

20 Claims, 15 Drawing Sheets

(52) U.S. Cl.
CPC .............. *B60R 2021/26029* (2013.01); *B60R 2021/26076* (2013.01); *B60R 2021/26088* (2013.01)

(56) References Cited

U.S. PATENT DOCUMENTS

| | | | | |
|---|---|---|---|---|
| 6,213,800 | B1* | 4/2001 | Mramor | H01R 13/7032 439/188 |
| 6,454,306 | B1* | 9/2002 | Cunningham | B60R 22/4633 102/202.14 |
| 6,526,890 | B1* | 3/2003 | Vidot | F42B 3/198 102/202.1 |
| 7,854,201 | B2* | 12/2010 | Oda | F42B 3/103 102/202.12 |
| 9,455,519 | B2* | 9/2016 | Isenmann | H01R 13/405 |
| 2005/0121894 | A1 | 6/2005 | Brisighella et al. | |
| 2005/0127649 | A1* | 6/2005 | Smith | B60R 21/2644 280/741 |
| 2006/0186653 | A1 | 8/2006 | Schoenhuber | |
| 2007/0193465 | A1* | 8/2007 | Stevens | F42B 3/107 102/202.1 |
| 2013/0276664 | A1* | 10/2013 | Ohsugi | B60R 21/2644 102/530 |

FOREIGN PATENT DOCUMENTS

| | | |
|---|---|---|
| DE | 202004014775 | 2/2005 |
| DE | 69925403 | 2/2006 |
| DE | 202006004008 | 7/2006 |
| DE | 10 2005 047768 | 3/2007 |
| DE | 10 2007 019285 | 9/2008 |
| DE | 102009013603 | 9/2010 |
| EP | 1 849 519 | 10/2007 |
| EP | 1 995 551 | 11/2008 |

* cited by examiner

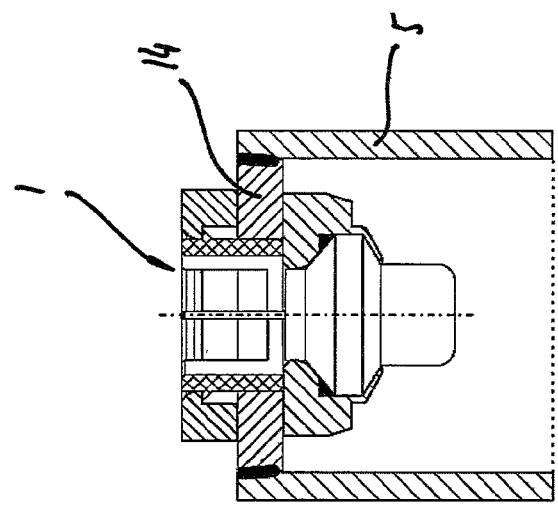
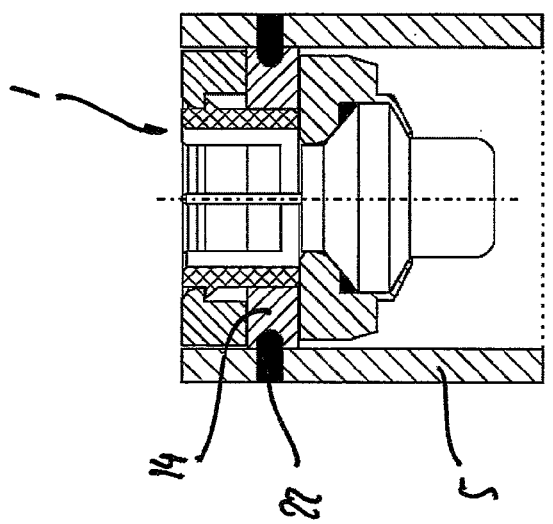

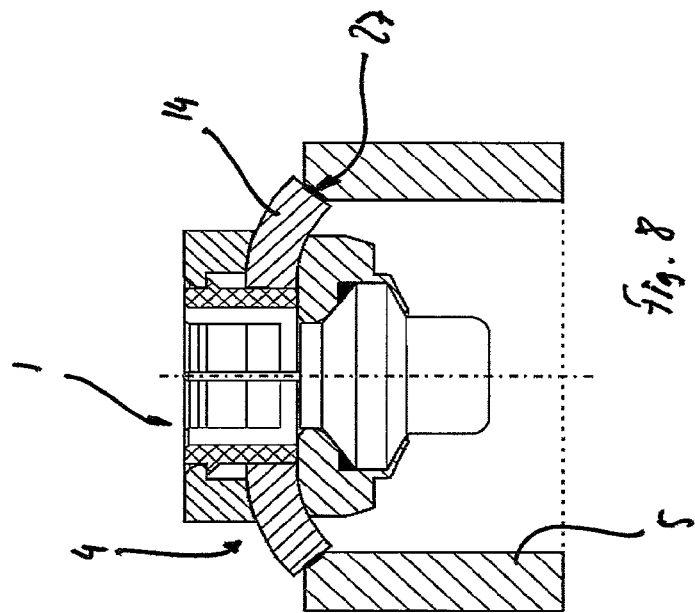
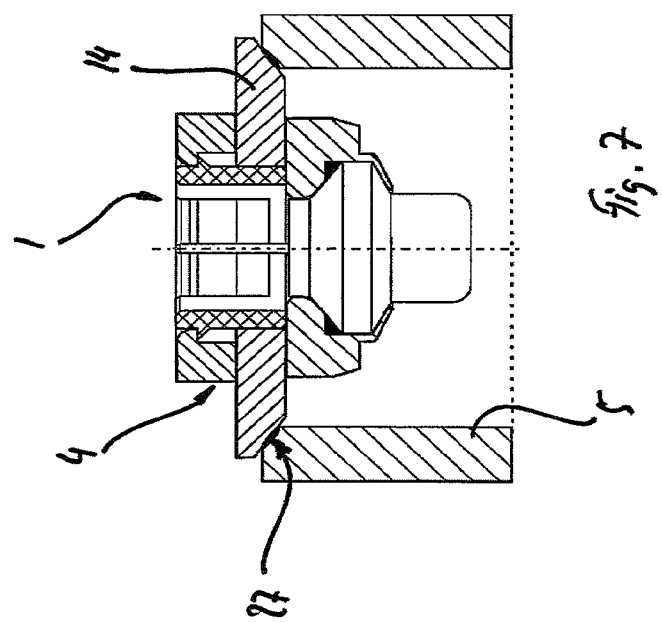

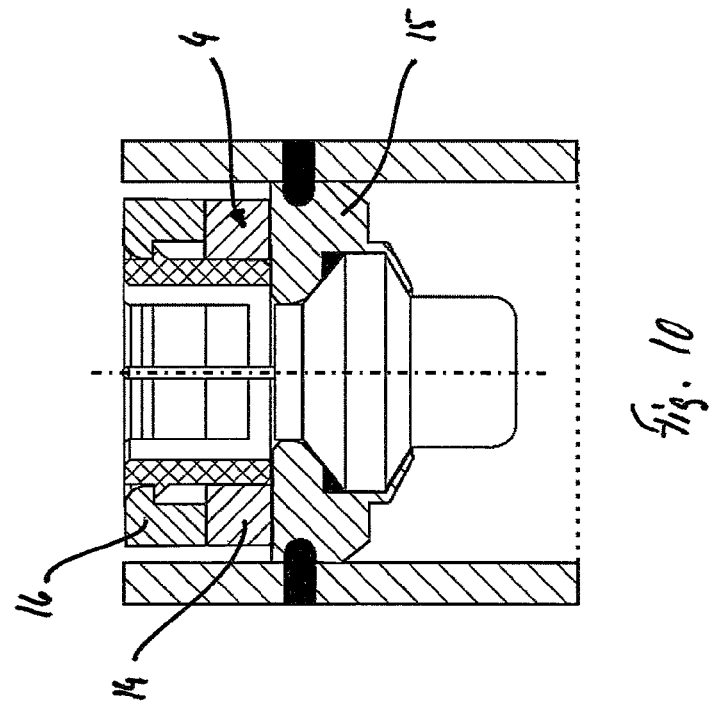
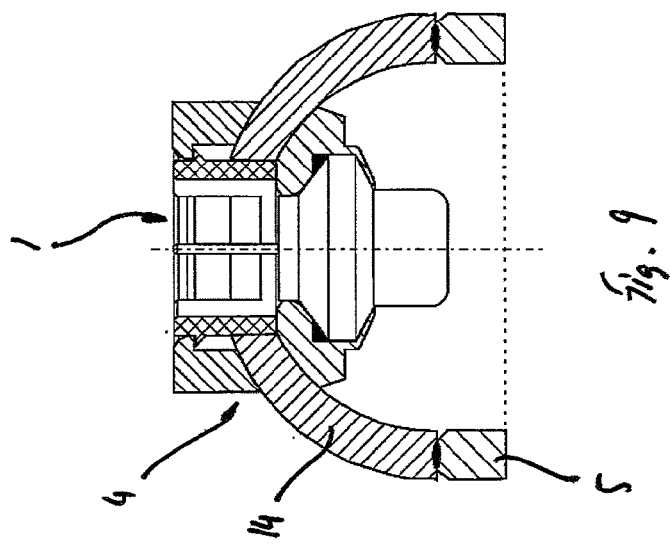
Fig. 9
Fig. 10

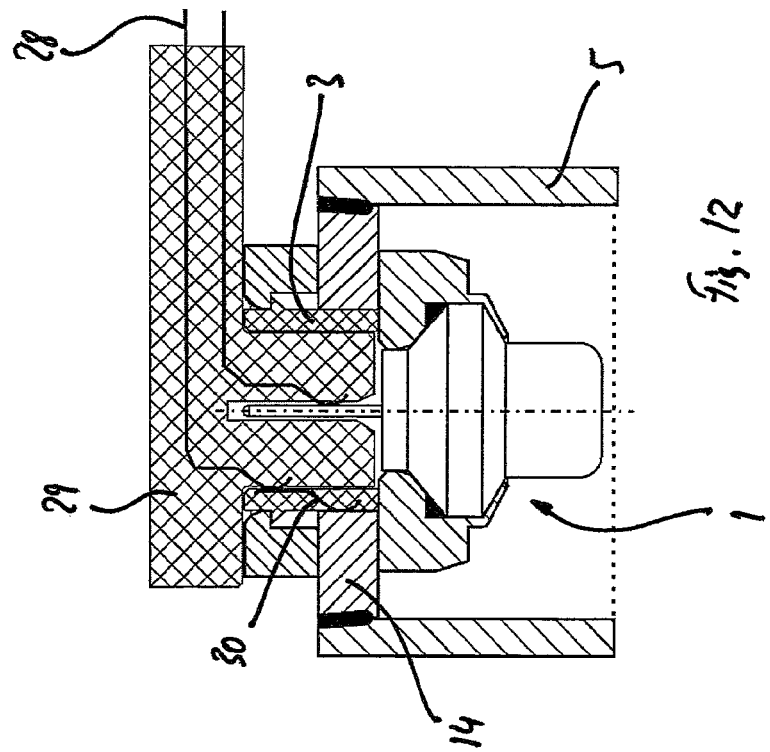
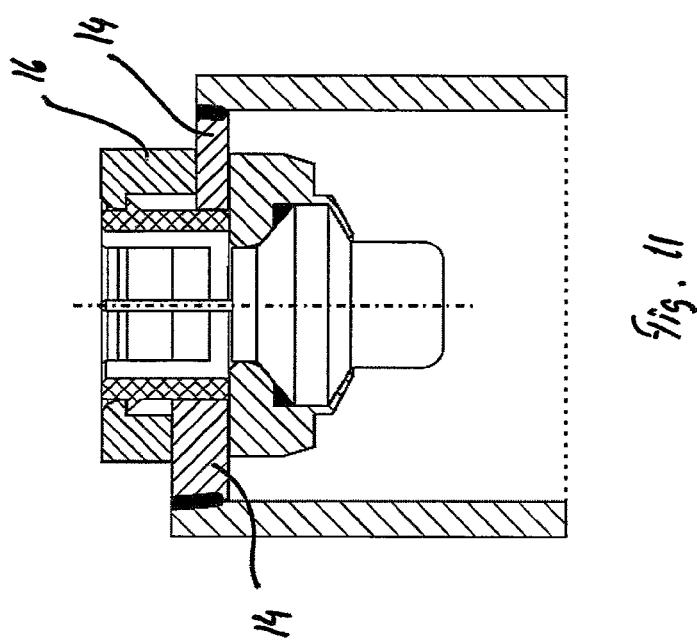

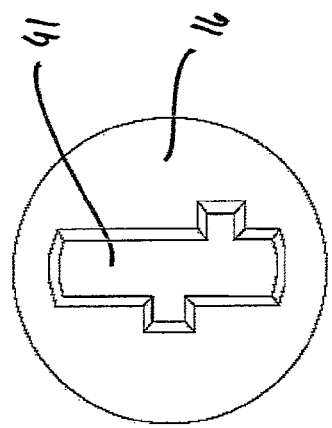
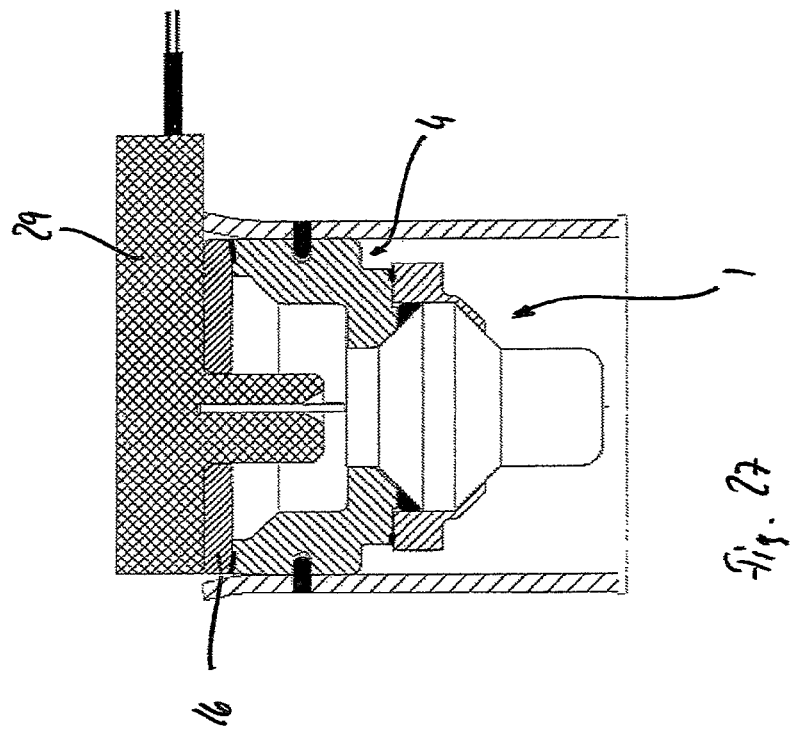
Fig. 28
Fig. 27

IGNITER CARRIER, IGNITER UNIT AND METHOD FOR PRODUCING AN IGNITER UNIT

The present invention relates to an igniter carrier for an igniter unit, in particular for a gas generator, including a first accommodating section for an igniter, a second accommodating section, and a connecting section for attaching the igniter unit, to an igniter unit, in particular for a gas generator, including an igniter and an igniter carrier, and to a method for manufacturing such an igniter unit.

BACKGROUND

An assembly is known from DE 10 2009 013 603 A1, including a pyrotechnic igniter, in particular for a gas generator, the igniter having contact pins for electrical contacting, further including connecting cables, which at their free ends have a terminal which is fixedly connected to the contact pins of the igniter, a mounting in which the igniter is attached and which defines an interface space into which the contact pins of the igniter protrude and in which the connecting cables are connected to the contact pins, and an additional ground wire which contacts the mounting, the interface space being filled with a casting compound, which surrounds the terminal and the ground wire at least in sections and is positioned to create an assembly including an igniter having a simple design.

SUMMARY OF THE INVENTION

It is an object of the present invention to provide an igniter carrier mentioned at the outset and an igniter unit mentioned at the outset, which are structurally and/or functionally improved. Moreover, a method for manufacturing such an igniter unit should be provided. The igniter carrier and/or the igniter unit should in particular have increased dimensional accuracy. The igniter carrier and/or the igniter unit should in particular have an increased reproducibility with respect to manufacturability and function. In particular, a manufacture with reduced complexity should be made possible. In particular, a variability should be increased. In particular, machining production processes, such as turning, should be avoided. In particular, a high-temperature strength should be increased. In particular, a thermal conductivity should be increased. In particular, a resistance against damage should be increased. In particular, a corrosion resistance should be increased.

The present invention provides an igniter carrier for an igniter unit, in particular for a gas generator, including a first accommodating section for an igniter, a second accommodating section, and a connecting section for attaching the igniter unit, the igniter carrier being prefabricated from multiple interconnected individual parts and being in turn able to be assembled as one individual part of an assembly with an igniter in one assembly process.

The gas generator may be used in a vehicle occupant restraint system. The gas generator may include a pyrotechnic propellant charge. The gas generator may be a solid propellant generator or a hybrid generator including a combustion chamber having a solid fuel and compressed gas. The gas generator may include a housing. The housing may include a tubular section.

The igniter unit may be situatable in or on the housing of the gas generator. Upon activation, the igniter unit may generate a hot gas and particles which ignite the pyrotechnic propellant charge in the combustion chamber. The igniter unit may be electrically activatable. The igniter unit may include the igniter, the connector part and the igniter carrier. The igniter may be a pyrotechnic igniter. The igniter may be an electrical igniter. The igniter may include an igniter housing. The igniter may include electrical contacts.

The igniter carrier may be used to accommodate the igniter accurately positioned and/or in an operationally reliable manner. The first accommodating section may be used for this purpose. The igniter carrier may be used to accommodate the connector part accurately positioned and/or in an operationally reliable manner. The second accommodating section may be used for this purpose. The igniter carrier may be used to carry the igniter and the connector part accurately positioned in relation to each other and/or in an operationally reliable manner. The igniter carrier may be used to carry the igniter and the connector part in each case accurately positioned in relation to the igniter carrier and/or in an operationally reliable manner. The igniter carrier may be used to situate the igniter unit on the gas generator, in particular on the housing of the gas generator, accurately positioned and/or in an operationally reliable manner. The connecting section may be used for this purpose.

The interconnected individual parts of the igniter carrier may in turn form one individual part. The igniter unit may be assembled from multiple individual parts to form one assembly. The igniter carrier may form one individual part of this igniter unit to be assembled to form one assembly. An assembly may be a self-contained object made up of two or more parts and/or assemblies of a lower order, it being possible for one individual part to be a technically described, non-collapsible object to be produced or produced according to a certain work sequence.

The second accommodating section may be used to accommodate a connector part, and the igniter carrier may be assembled as one individual part of one assembly with an igniter and a connector part in one assembly process.

The connector part may be a plug connector part. The connector part may be a plastic part. The connector part may include a female plug. The connector part may be used to accommodate a plug for contacting the igniter. The connector part may include detent lugs for the connection to the igniter carrier. The connector part may have a pot-like shape having a wall section and a bottom section. Passages for contacts of the igniter may be provided in the bottom section. The detent lugs may be situated radially outside on the wall section.

The igniter carrier may be prefabricated from at least two interconnected individual parts. The igniter carrier may be prefabricated from three interconnected individual parts. The individual parts of the igniter carrier may in each case have an annular shape. One individual part of the igniter carrier may have a rectangular cross section having a radially outer edge. The radially outer edge may form the connecting section. The radially outer edge may form a largest outside diameter of the igniter carrier. This individual part may also be referred to as a carrier. One individual part of the igniter carrier may have a cross section having an edge section which is radially inwardly directed in a hook-like manner. This individual part may form the second accommodating section. This individual part may also be referred to as an orientation ring. One individual part of the igniter carrier may have a cup-shaped design having a recessed radially inner edge section. This individual part may form the second accommodating section. This individual part may also be referred to as an orientation ring. The cup-like shape may have been created with the aid of forming from a tube section. The cup-like shape may have been created with the aid of rolling and forming from a tube section. The cup-like shape may have been created with the aid of crimping. One individual part of the igniter carrier may have a cross section having a bevel which is situated radially inside and forms a cone section. This individual part may form the first accommodating section. This individual part may also be referred to as an igniter ring. The individual parts of the igniter carrier may be situated along an axis. The individual parts of the igniter carrier may be situated coaxially to each other. The carrier may be situated between the orientation ring and the igniter ring.

At least two individual parts may be made of different materials in each case. At least two individual parts may include different materials, a material selection in each case being made which meet the requirements. In the material selection, in each case a preferably favorable material may be selected which sufficiently meets the particular requirement. One requirement may relate to a strength. One requirement may relate to an electrical conductivity. One requirement may relate to a corrosion protection. One requirement may relate to a weldability. One requirement may relate to a manufacturability. At least two individual parts may be integrally interconnected. At least two individual parts may be interconnected with the aid of welding. At least two individual parts may be interconnected with the aid of gluing. The joint may have a sealed design. On the joint, a comparatively low strength may be accepted. At least two individual parts may be interconnected in a force-fit and/or form-locked manner. At least two individual parts may be interconnected with the aid of crimping and/or rolling.

At least one individual part may be manufactured in a stamping process and/or in a forming process. The forming process may be a forging process. The forming process may be a pressure forming process. The forming process may be an impact extrusion process. At least one individual part may be manufactured from a sheet metal. The sheet metal may have a thickness of approximately 2.0 mm to approximately 4.5 mm, in particular approximately 3.5 mm.

The at least one individual part may include an insert, and the at least one individual part and the insert may in each case have different materials. The insert may be manufactured from a stainless steel. The insert may be manufactured from a thin sheet metal. The insert may be manufactured in a deep drawing process. The insert may be integrally formed in the course of a forming process which is to be carried out anyhow. The at least one individual part may be manufactured from a non-stainless steel. The insert may be used for corrosion protection and/or for reliable electrical contacting.

A first individual part may include the connecting section, and this first individual part may include a high-strength and easily weldable metal material, such as stainless steel. The first individual part may include an alloyed stainless steel. The first individual part may include a stainless steel containing ≥2.5% of nickel. The first individual part may include a steel having the material number 1.4301. In the selection of the material of the first individual part, a suitability for machining may be insignificant.

A second individual part may include the first accommodating section and/or the second accommodating section. The second individual part may include a metal material, such as a steel or aluminum alloy, or a plastic material.

The material of the first individual part may be selected with respect to a high corrosion resistance. The material of the first individual part may be selected with respect to a sufficient strength. The material of the first individual part may be selected with respect to a good weldability.

The second individual part may have a contoured recess for the oriented accommodation of a plug. The second individual part may have a disk-like shape. The recess may correspond to a female plug. The second individual part may include an integrated short circuit spring.

The igniter carrier may include an undercut section corresponding to a detent section of a connector part. The detent section may be formed with the aid of an edge section which is radially inwardly directed and has a hook-like cross section. The igniter carrier may include a guide section corresponding to a guide section of a connector part. The igniter carrier may have at least one axially extending groove, which is used to correspond to an extension of the connector part. The igniter carrier may have at least one extension, which is used to correspond to an axially extending groove of the connector part. The guide section of the igniter carrier and the guide section of the connector part may form an anti-twist lock. In this way, the connector part and the igniter carrier may be installed oriented with respect to each other.

The igniter carrier may include an edge section, which is formable for fixing an igniter. The edge section may be radially inwardly formable. The igniter carrier may form an ignition chamber. For this purpose, the igniter carrier may have a pot-like shape. The igniter carrier may include a contour section for a corresponding connector part to be joined to the connector part. The corresponding connector part may be part of a plug. The contour section may have a hook-like shape. The contour section may be pressed against the igniter carrier. The contour section may have a pin-like shape. The contour section may be welded to the igniter carrier. The corresponding connector part may have a hole for accommodating the pin-like contour section.

At least one individual part may be integratable into a housing of a gas generator. The first individual part and/or the second individual part may be integratable into a housing of a gas generator. An integration may be carried out by flush joining.

The object underlying the present invention is additionally achieved by an igniter unit, in particular for a gas generator, including an igniter and such an igniter carrier. The igniter unit may include a connector part. The igniter may be sealingly held on the first accommodating section of the igniter carrier with the aid of a formed edge section of the igniter carrier, if necessary using a sealing element. The connector part may be latched to the igniter carrier in a form-locked manner. With the aid of the connector part, it is possible to establish an electrical contact with the igniter carrier. The connector part may include an electrical contact. This contact may enable electrical contacting through the wall section of the connector part.

The object underlying the present invention is additionally achieved by a method for manufacturing such an igniter unit, including at least one of the steps of prefabricating the igniter carrier, inserting a sealing element into the igniter carrier, orienting the igniter, inserting the igniter into the igniter carrier, forming an edge section of the igniter carrier for fixing the igniter, orienting the connector part and/or inserting the connector part into the igniter carrier.

The igniter carrier according to the present invention and/or the igniter unit is/are cost-effective to manufacture. The individual parts of the igniter unit are cost-effective to manufacture. The igniter carrier according to the present invention and/or the igniter unit has/have an increased dimensional accuracy. The igniter carrier and/or the igniter unit has/have an increased reproducibility with respect to manufacturability and function. A manufacture is possible with reduced complexity. Variability is increased. Machining production processes, such as turning, are avoided. High-temperature strength is increased. Thermal conductivity is increased. Resistance against damage is increased. Corrosion resistance is increased.

In summary and in other words, the present invention thus results, among other things, in an igniter unit as an assembly, which may be installed in a tube, for example with the aid of welding, riveting and the like. The igniter unit may include an assembled igniter carrier, an O-ring for sealing, an igniter in standard design, a retainer having a female plug, a short circuit spring and a grounding as the 3rd pole point. The igniter unit may be joinable to a housing of a gas generator, for example to a tube. The assembled igniter carrier may include the components carrier, igniter ring and orientation ring.

The carrier may be the supporting element of the assembled igniter carrier. The carrier may be designed as a ring having a rectangular profile. The necessary load-bearing capacity may be adjusted via a strength of the material. The simple shape of the carrier also allows a use of high-strength and easily weldable materials, e.g., 1.4301, if necessary with preconsolidation. A preconsolidation may be carried out using >600 MPa. The carrier may be manufactured from a corrosion-resistant steel. Contours, which are necessary for the particular installation process, may be easily created on the outer region of the carrier.

The igniter ring may be manufactured as a simple impact-extruded part or a forging. The igniter ring may be manufactured from an aluminum alloy which has sufficient strength while having good corrosion resistance. As an alternative, it is also possible to use other materials, such as steel, for very high strengths. The igniter ring may have compressible welding lips, which melt during welding. The igniter ring may be manufactured from a plastic, for example as an injection-molded part. The igniter ring may be produced as a deep-drawn part from sheet metal. The igniter ring may be used as a supporting element. The igniter ring may have a variable design over its outer contour, so that it is able to assume additional tasks, such as that of accommodating sealing rings, filler bodies or other elements necessary for operating a gas generator.

Like the igniter ring, the orientation ring may be manufactured from steel, an aluminum alloy or plastic. The orientation ring may be produced as a deep-drawn part from sheet metal.

The components igniter ring and carrier are preferably interconnected with the aid of a welding process. Common welding processes, such as resistance welding, laser welding or friction welding, are possible. The strength requirements in regard to the weld joint are low since a loading of the assembled igniter carrier takes place with an internal pressure on the side of the igniter. Welding processes offer a high tightness of the joint. The igniter ring may be glued to the carrier or, e.g., be attached with the aid of ultrasonic welding. A joining technology for connecting the orientation ring may correspond to a joining technology of the joint between the igniter ring and the carrier. The strength requirements are low, and tightness is not required.

Known assembly forms may be usable for this igniter carrier, such as riveting/rolling/force fitting, or welding processes, such as laser, axial/radial, resistance, capacitor discharge, medium frequency, or friction welding and the like. The known assembly methods may be usable.

The igniter carrier may be preassembled from three individual parts with the aid of welding, and the igniter carrier may be preassembled with an igniter, a sealing element, e.g., an O-ring, and a retainer to form an igniter unit assembly, which in the event of activation ignites a pyrotechnic propellant bed, optionally via an additional booster charge, whereby the gas generator produces gas which fills an airbag. The individual parts of the igniter carrier may be made of different materials, which are preferably joined with the aid of welding, so that the joint may be implemented in a gas-tight manner if necessary. The individual parts of the igniter carrier may be made of easily and cost-effectively producible stamped, impact-extruded and forged parts. As the part absorbing the primary load in the event of activation, the carrier as one individual part may also be made of high-strength sheet metal material, which is also easily weldable for joining to the gas generator housing with the aid of various methods, such as laser, capacitor discharge, medium frequency or friction welding. The individual parts that are the igniter ring and orientation ring may be manufactured as injection-molded plastic parts, which are welded or glued to the carrier, the carrier not being weakened, as is the case with plastic injection molding, by openings through which the plastic is injected. The individual part that is the carrier may be stamped from high-strength steel sheet and formed to obtain load-capable shapes, such as curved, for example, or as a spherical cap. The individual part that is the carrier may be configured in such a way that it withstands, with sufficient strength and without difficulty, the loads during mechanical assembly, e.g., rolling, riveting, for integration into the gas generator housing and protects the igniter and retainer preassembled therein. A maximal height of the individual part that is the carrier may be approximately 2.0 mm to approximately 4.5 mm from the sheet metal thickness, in particular approximately 3.5 mm; however the sheet metal thickness is variable, and low sheet metal thicknesses may be used, it being possible to compensate for the lower height of the carrier by an increased height of the orientation ring. A grounding may be achieved via the carrier, preferably made of a corrosion-resistant steel and having a minimal height of 3 mm (=sheet metal thickness), such as the grounding which may be implemented with 3-pole plugs and retainer when the carrier forms an electrically conductive contact to the housing of the gas generator. This assembled igniter carrier allows the use of standard igniters, as is presently only possible by igniter carriers manufactured by machining. The carrier, connected to the housing of the gas generator, and orientation and igniter rings, preferably produced from steel or aluminum, ensure very good heat conduction, as is necessary in the extreme burnout case. This may be tested with the aid of bonfire tests and burnout tests as part of a BAM (Federal Institute for Materials Research and Testing) and transportation approval. The igniter ring may also be designed in such a way that it is able to assume the function of a filler body and provides a volume, e.g., for a booster charge. The orientation ring, e.g., implemented as a simple forging or impact-extruded part, may form an undercut in a simple manner, which is necessary for detent hooks of the retainer and plug. The orientation ring may have a shape on the outside which deviates from that of a cylinder, or even include pressed-on molded elements, which are used to support the plug or the like. The orientation ring may also be implemented as a deep-drawn part, preferably manufactured from sheet metal maximally 1.5 mm thick. For two-stage gas generators, as they are required by law in the U.S. on the driver and passenger sides, for example, two igniter units may be implemented in one assembly in a simple manner. As a stamped part, the carrier may also take on an outer contour deviating from the cylindrical shape and thus be designed to be compatible with other housing parts.

"May" denotes in particular optional features of the present invention. Accordingly there is one exemplary embodiment of the present invention in each case which includes the particular feature or the particular features.

BRIEF DESCRIPTION OF THE DRAWINGS

Exemplary embodiments of the present invention are described in greater detail hereafter with reference to figures. Additional features and advantages are derived from this description. Specific features of these exemplary embodiments may represent general features of the present invention. Features of these exemplary embodiments combined with other features may also represent individual features of the present invention. As shown schematically and by way of example:

FIG. 3 shows an igniter unit radially welded to a housing of a gas generator;

FIG. 4 shows an igniter unit axially welded to a housing of a gas generator;

FIG. 7 shows an igniter unit which is welded to a housing of a gas generator and includes an igniter carrier having a chamfered carrier;

FIG. 8 shows an igniter unit which is welded to a housing of a gas generator and includes an igniter carrier having a curved carrier;

FIG. 9 shows an igniter unit which is welded to a housing of a gas generator and includes an igniter carrier having a spherical cap-shaped carrier;

FIG. 10 shows an igniter carrier having a supporting igniter ring;

FIG. 11 shows a compensation of a reduced carrier height by an orientation ring;

FIG. 12 shows a contacting via a connector part of an igniter unit;

FIG. 13 shows an igniter unit including an igniter carrier, which forms an ignition chamber;

FIG. 27 shows an igniter unit including an igniter carrier, which has an orientation ring having a contoured recess for the oriented accommodation of a plug; and FIG. 28 shows an orientation ring having a contoured recess for the oriented accommodation of a plug.

DETAILED DESCRIPTION

Figure 1:
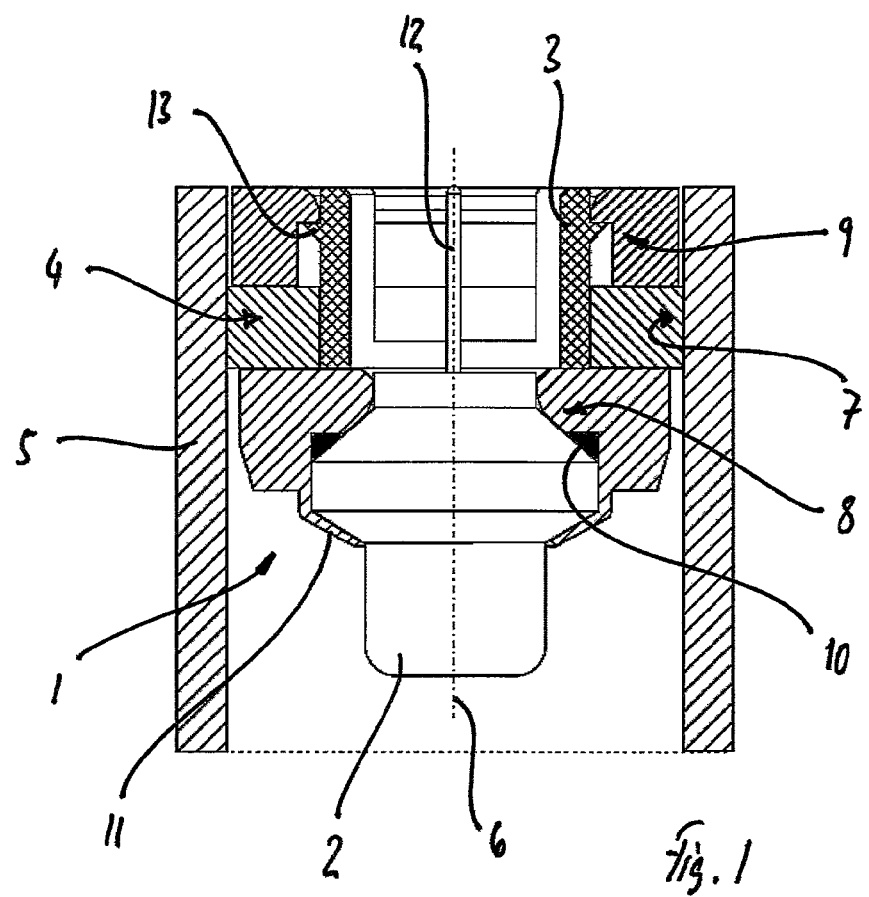
FIG. 1 shows an igniter unit including an igniter, a connector part and an igniter carrier in a housing of a gas generator.

FIG. 1 shows an igniter unit 1 including an igniter 2, a connector part 3 and an igniter carrier 4 in a tubular housing 5 of a gas generator. The present example only shows a section of the gas generator, which includes the igniter unit 1. An axis of symmetry is denoted by 6.

Igniter carrier 4 includes a connecting section 7. Connecting section 7 is used for the connection to housing 5. Igniter carrier 4 has an accommodating section 8 for igniter 2. Igniter carrier 4 has an accommodating section 9 for connector part 3.

Igniter 2 includes an igniter housing, with which it is accommodated resting against accommodating section 8. An O-ring seal 10 is situated between igniter 2 and accommodating section 8. Igniter 2 is fixed with the aid of a formed edge section 11 of igniter carrier 4. Igniter 2 has pin-shaped contacts 12.

Connector part 3 has a pot-like shape having a bottom section and a wall section. Radially on the outside on the wall section, connector part 3 includes detent hooks 13. Connector part 3 is latched in igniter carrier 4 in the axial direction. Connector part 3 forms a holder for a plug for contacting contacts 12. Contacts 12 protrude through the bottom section of connector part 3 into the holder. Connector part 3 is manufactured from plastic.

Figure 2:
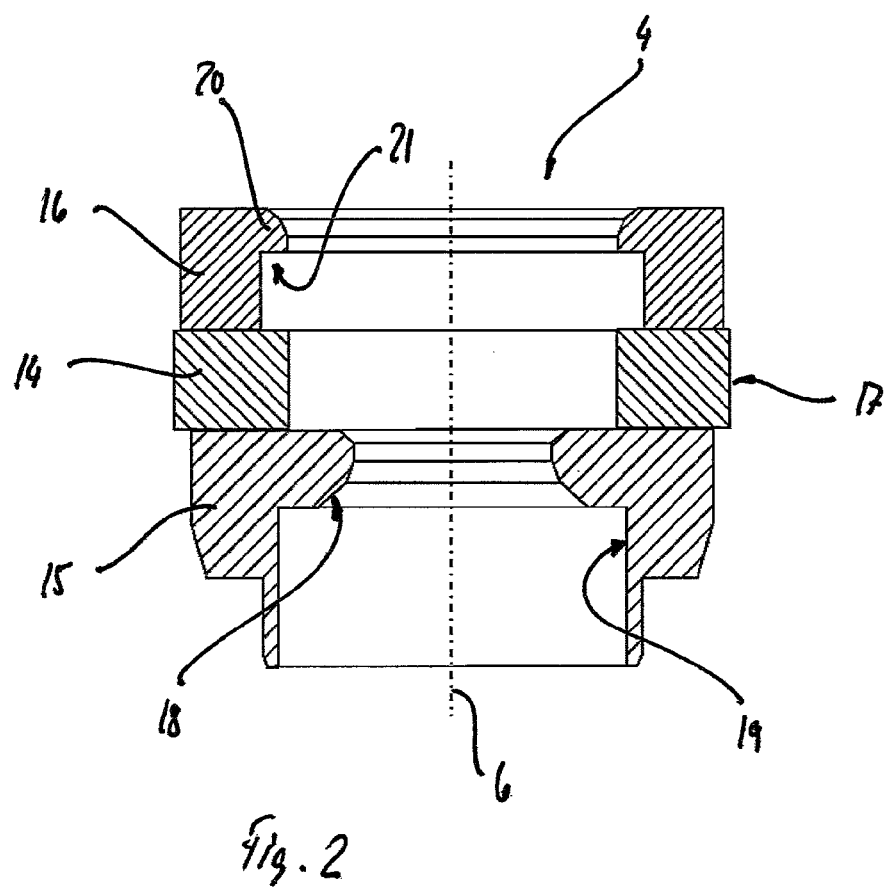
FIG. 2 shows an igniter carrier manufactured from three interconnected individual parts.

FIG. 2 shows an igniter carrier 4 manufactured from three interconnected individual parts, like igniter carrier 4 according to FIG. 1. Igniter carrier 4 includes a carrier 14, an igniter ring 15 and an orientation ring 16. Carrier 14, igniter ring 15 and orientation ring 16 are situated concentrically to each other along axis 6. Carrier 14 is situated between igniter ring 15 and orientation ring 16.

Carrier 14 is designed as a ring having a rectangular cross section. Radially on the outside, carrier 14 has a rest surface 17 for the connection to a housing of a gas generator. Rest surface 17 forms the largest outside diameter of igniter carrier 4. Igniter ring 15 has an L-shaped cross section. Igniter ring 15 has a conical rest surface 18. Radially on the inside, igniter ring 15 has a rest surface 19. Rest surfaces 18, 19 are used for an igniter to rest against. Igniter ring 15 has a formable edge section 11. Edge section 11 is used to fix the igniter. Orientation ring 16 has a cross section having a radially inwardly directed hook-like extension 20. In this way, an annular undercut 21 is formed. Undercut 21 is used for latching detent hooks of a connector part.

Carrier 14 is manufactured from a high-strength and easily weldable material, such as stainless steel. Igniter ring 15 and orientation ring 16 are manufactured from a material which has sufficient strength while having good corrosion resistance, for example from steel, an aluminum alloy or plastic. Carrier 14, igniter ring 15 and orientation ring 16 are fixedly interconnected to form one individual part, which may be installed in one assembly. Carrier 14, an igniter ring 15 and an orientation ring 16 are welded to each other, for example.

FIG. 3 shows an igniter unit 1 radially welded to a housing 5 of a gas generator. Igniter unit 1 is pressed into a housing 5 via a carrier 14 and radially welded with the aid of a laser or in the manner of similar methods. A weld seam is denoted by 22.

FIG. 4 shows an igniter unit 1 axially welded to a housing 5 of a gas generator. Carrier 14 has an enlarged diameter, is pressed into the housing and welded thereto, preferably in the axial direction.

Figure 5:
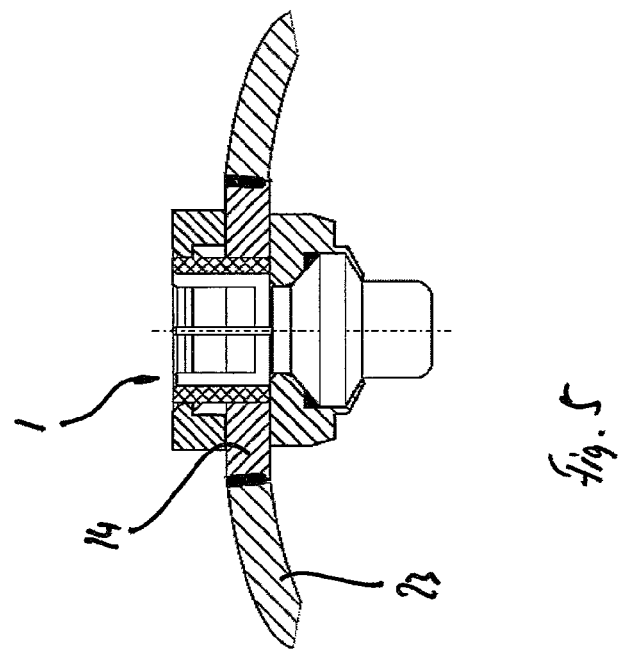
FIG. 5 shows an igniter unit welded to a flat housing section of a gas generator.

FIG. 5 shows an igniter unit 1 welded to a flat housing section 23 of a gas generator. Carrier 14 has an enlarged diameter and is pressed into the wall of a gas generator housing having a rather flat design (driver's side) and is welded predominantly in the axial direction.

Figure 6:
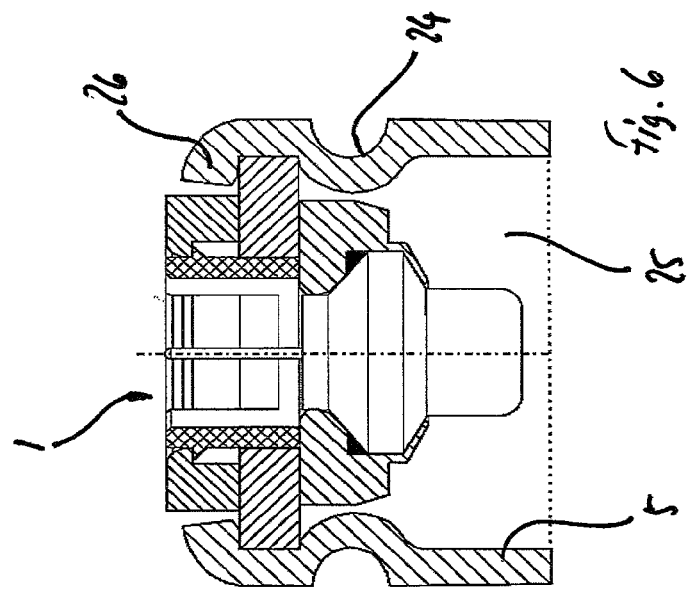
FIG. 6 shows an igniter unit joined to a housing of a gas generator in a form-locked manner.

FIG. 6 shows an igniter unit 1 joined to a housing 5 of a gas generator in a form-locked manner. Igniter unit 1 is fixed using mechanical forming. Igniter unit 1 is pressed into housing 5. A rolling process 24 (bottom) prevents sliding through into interior 25 and supports igniter unit 1 during a further forming process (top). Further forming process 26 may be carried out as a rolling process or also as a riveting process.

FIG. 7 shows an igniter unit 1 which is welded to a housing 5 of a gas generator and includes an igniter carrier 4 having a chamfered carrier 14. Carrier 14 has a chamfer or conical surface 27 and is welded thereto.

FIG. 8 shows an igniter unit 1 which is welded to a housing 5 of a gas generator and includes an igniter carrier 4 having a curved carrier 14. The formerly cylindrical or disk-shaped carrier thus forms a lateral surface formed into a conical surface 27.

FIG. 9 shows an igniter unit 1 which is welded to a housing 5 of a gas generator and includes an igniter carrier 4 having a spherical cap-shaped carrier 14. This carrier 14 is suitable in particular for very high loads due to high internal pressures during the operation of the gas generator.

FIG. 10 shows an igniter carrier 4 having a supporting igniter ring 15. In this embodiment, igniter ring 15 assumes the supporting function. This may be necessary under certain installation situations. Due to the higher strength requirement, igniter ring 15 is then manufactured from a high-strength steel. Carrier 14 and orientation ring 16 may be manufactured in one piece.

FIG. 11 shows a compensation of a reduced carrier height by an orientation ring 16. The left half of the drawing shows a carrier 14 having maximal material thickness, which may result from a sheet metal thickness. The right half of the drawing shows a variant in which carrier 14 has a reduced material thickness and orientation ring 16 compensates for a height.

FIG. 12 shows a contacting via a connector part 3 of an igniter unit 1. In this way grounding is possible. A grounding terminal 28 of a plug 29 electrically contacts a contact spring 30, which is situated in connector part 3 and in turn is in electrical contact with carrier 14. Carrier 14 is welded to housing 5 of a gas generator.

FIG. 13 shows an igniter unit 1 including an igniter carrier 4, which forms an ignition chamber 31. A propellant charge 32 is situated in ignition chamber 31.

Figure 14:
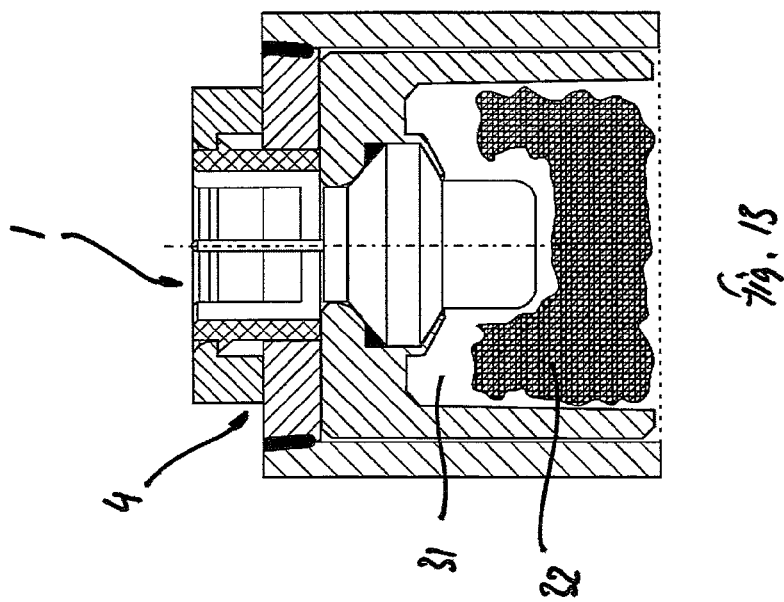
FIG. 14 shows an igniter unit including an igniter carrier, which has a contour section for a plug.
Figure 15:
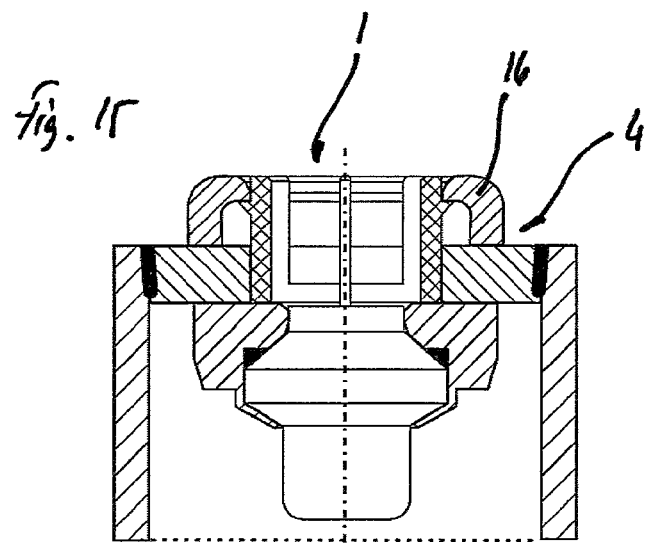

FIG. 14 shows an igniter unit 1 including an igniter carrier 4, which has a contour section for a plug 29. Orientation ring 16 includes a pressed-on hook 33 as an insertion aid and as an anti-twist lock for plug 29.

Figure 15:
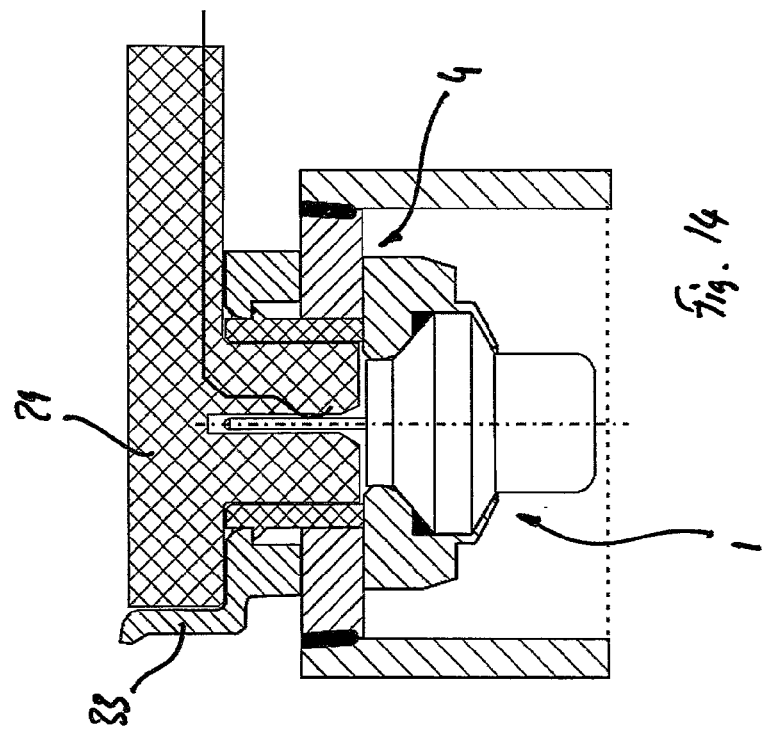
FIG. 15 shows an igniter unit including an igniter carrier having an orientation ring as a deep-drawn part.

FIG. 15 shows an igniter unit 1 including an igniter carrier 4 having an orientation ring 16 as a deep-drawn part.

Figure 16:
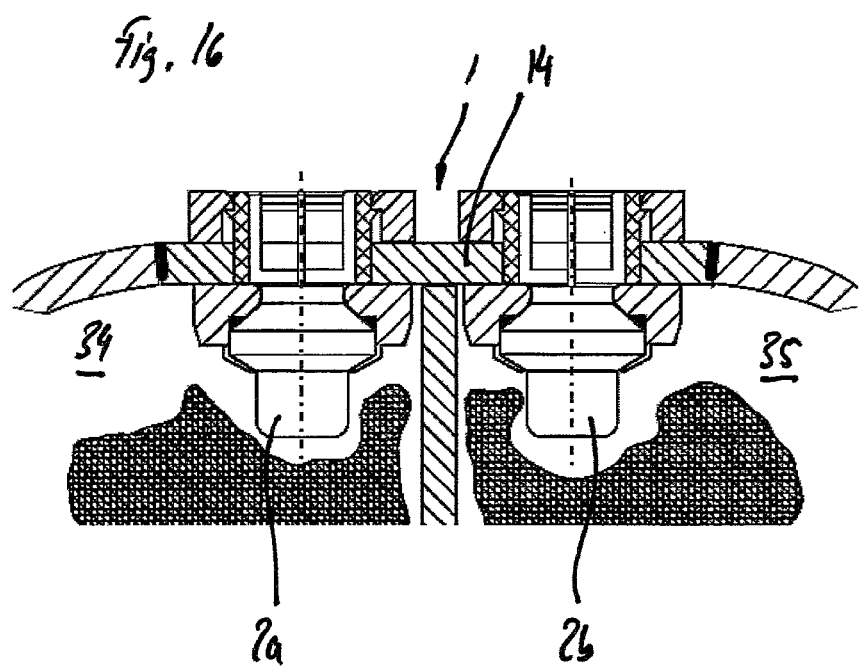
FIG. 16 shows an igniter unit implemented as a double igniter unit.

FIG. 16 shows an igniter unit 1 implemented as a double igniter unit. This igniter unit 1 may be used in a two-stage gas generator having two chambers 34, 35. Igniter unit 1 is equipped with two igniters 2a, 2b in a two-stage manner, carrier 14 accommodating both igniters 2a, 2b.

Figure 17:
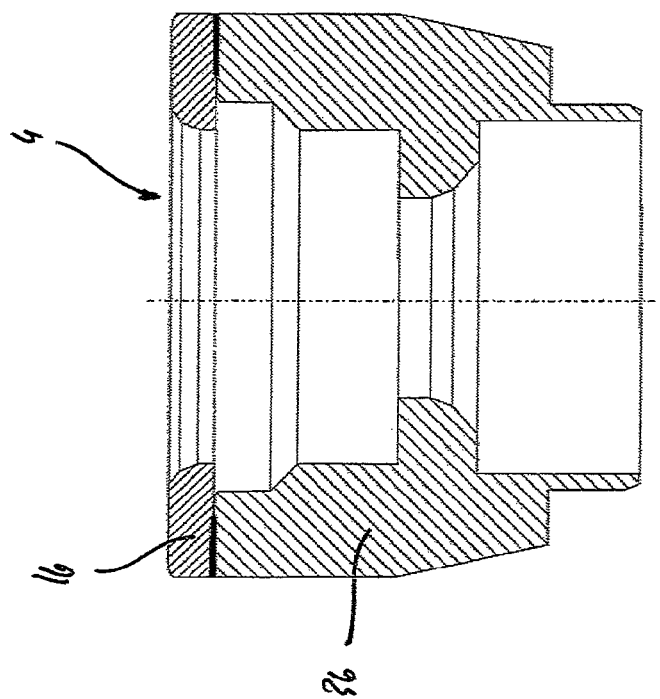
FIG. 17 shows an assembled igniter carrier having an orientation ring stamped from a sheet material.

FIG. 17 shows an assembled igniter carrier 4 having an orientation ring 16 stamped from a sheet material. The carrier and the igniter ring are designed in one piece in the present example as a carrier/igniter ring 36. The assembled igniter carrier 4 is thus composed of two parts. Orientation ring 16 rests on carrier/igniter ring 36 in a radially inwardly projecting manner. Orientation ring 16 is joined to carrier/igniter ring 36 with the aid of laser welding.

Figure 18:
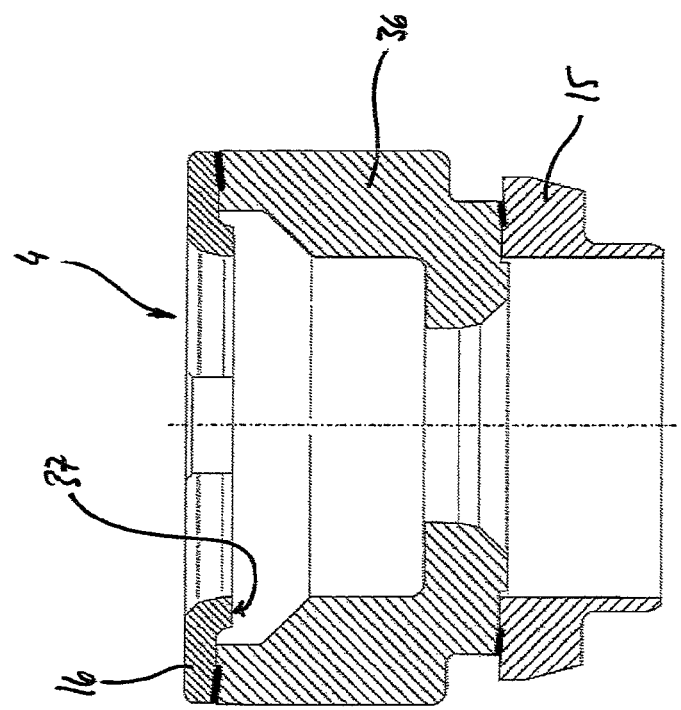
FIG. 18 shows a three-piece igniter carrier having a cup-shaped orientation ring as a stamped and deep-drawn part.

FIG. 18 shows a three-piece igniter carrier 4 having a cup-shaped orientation ring 16 as a stamped and deep-drawn part made of a thin-walled sheet material, preferably less than 1.45 mm Cup-shaped orientation ring 16 has a radially inner edge section 37, which is recessed toward the carrier/igniter ring 36. Carrier/igniter ring 36 is an impact-extruded part. Carrier/igniter ring 36 is preferably manufactured from stainless steel. A flange ring 38 for attaching an igniter is welded to carrier/igniter ring 36. Flange ring 38 is an impact-extruded part. Flange ring 38 is produced from simple black steel, for example. The weldings are produced in a laser welding process.

Figure 19:
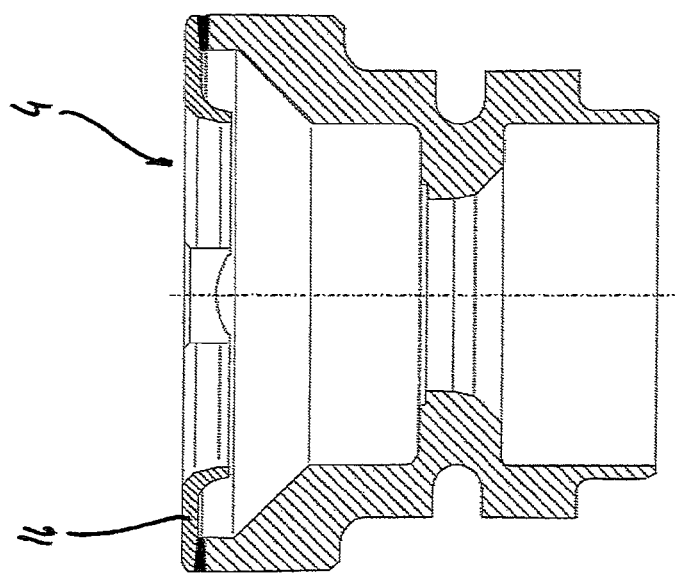
FIG. 19 shows an igniter carrier having a cup-shaped orientation ring, which is manufactured from a tube section with the aid of rolling and forming.

FIG. 19 shows an igniter carrier 4 having a cup-shaped orientation ring 16, which is manufactured from a tube section with the aid of rolling and forming. As an alternative, a manufacture may also be carried out with the aid of crimping.

Figure 20:
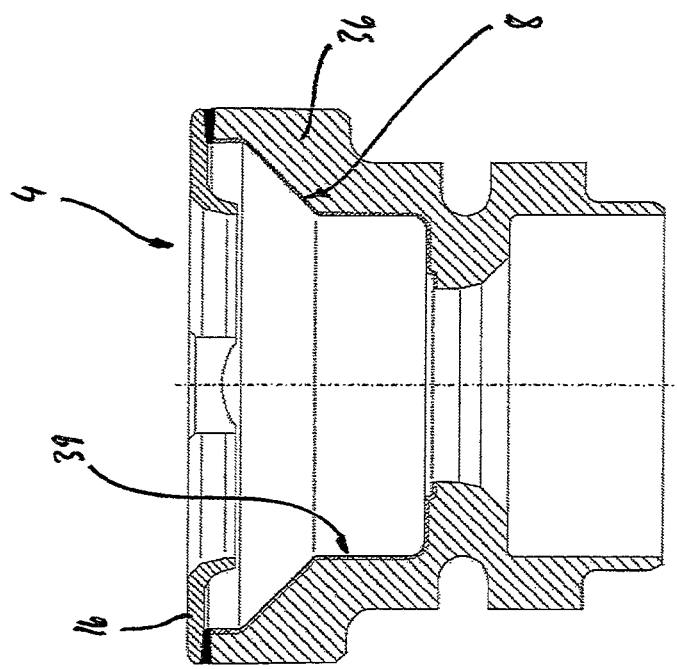
FIG. 20 shows an igniter carrier having an insert.

FIG. 20 shows an igniter carrier 4 having an insert 39. Insert 39 is situated on first accommodating section 8. Insert 39 is manufactured from a stainless steel. Insert 39 is deep-drawn from a thin sheet metal. Insert 39 has a cup-like shape. Insert 39 may be integrally formed as part of a forming process of orientation ring 16. For this purpose, an outer part of carrier/igniter ring 36 is manufactured from black steel, for example, having an accordingly necessary strength. The corrosion protection requirement is divided up. High-quality material is saved. Insert 39 is used for corrosion protection and for secure contacting of a third pole point. The corrosion protection results after all components have been assembled, including the igniter and the connector part. A sealed corrosion-protected space is created in particular by the igniter, which protrudes into insert 39, insert 39 being made of stainless steel, and orientation ring 16 being made of stainless steel or alternatively of aluminum.

Figure 22:
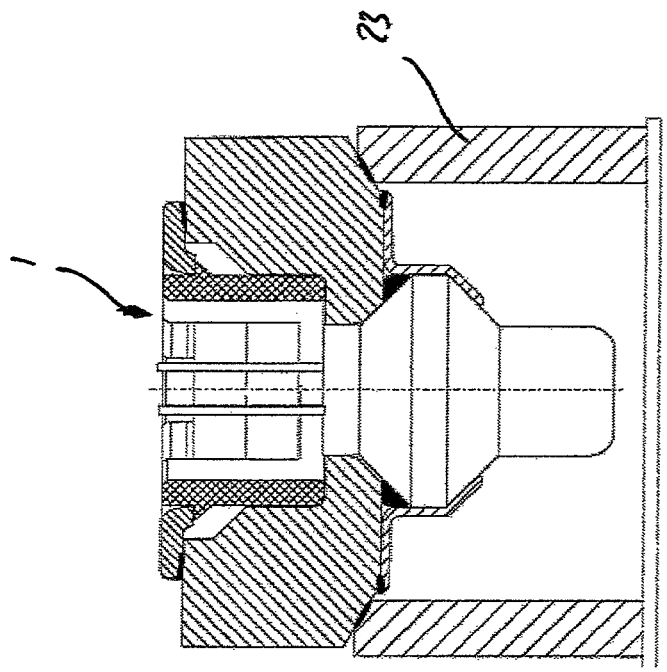
FIG. 22 shows an igniter unit resistance-welded to a housing of a gas generator.
Figure 21:
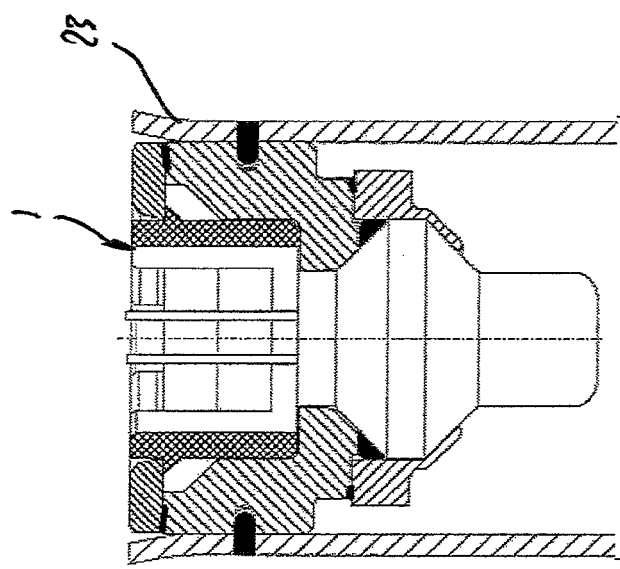
FIG. 21 shows an igniter unit laser-welded to a housing of a gas generator.
Figure 23:
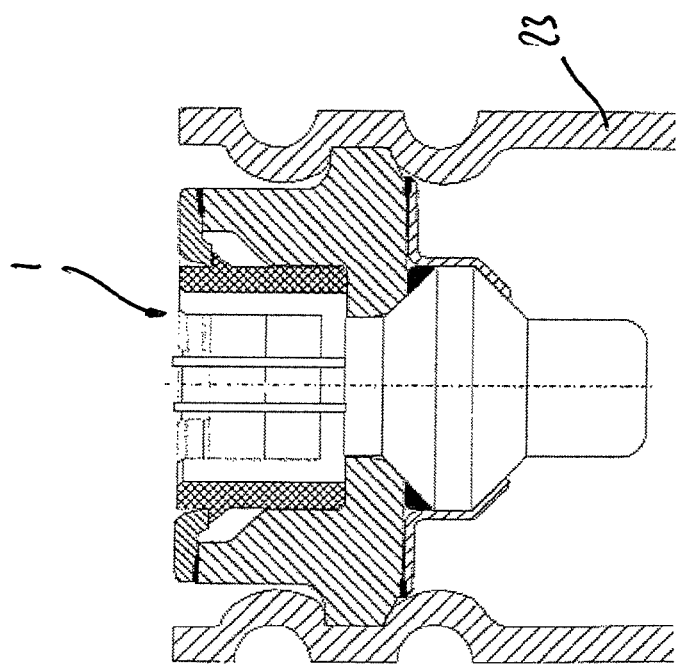
FIG. 23 shows an igniter unit joined to a housing of a gas generator with the aid crimping/rolling.

FIG. 21 shows an igniter unit 1 laser-welded to a housing 23 of a gas generator. FIG. 22 shows an igniter unit 1 resistance-welded to a housing 23 of a gas generator. FIG. 23 shows an igniter unit 1 joined to a housing 23 of a gas generator with the aid of crimping/rolling.

Figure 24:
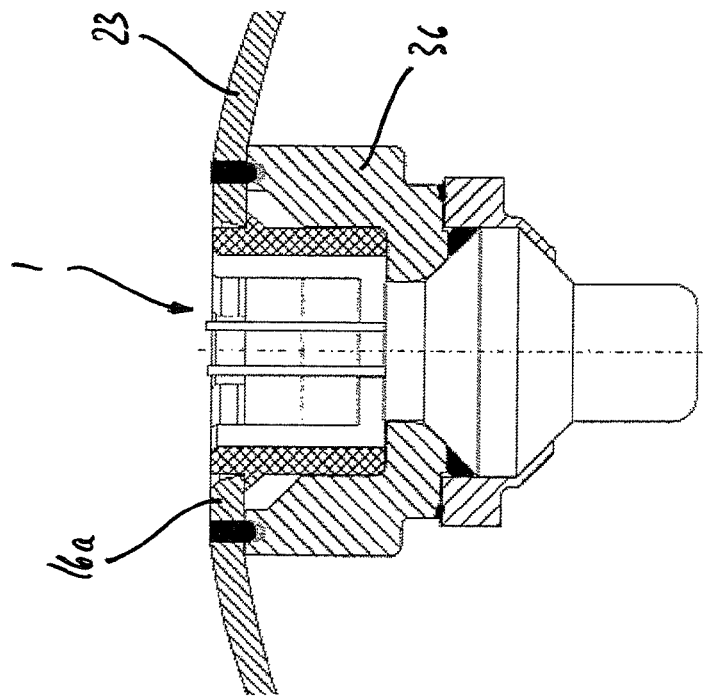
FIG. 24 shows an igniter unit which is integrated together with an orientation ring into a housing of a gas generator.

FIG. 24 shows an igniter unit 1, the functions of the orientation ring being assumed by a section 16a of housing 23 of a gas generator. The outer side of functional section 16a, if it does not protrude, may end flush with the outer side of housing 23. Carrier/igniter ring 36 is situated on the inner side of housing 23 fitting to section 16a and is welded to housing 23. The weld joint is preferably implemented as a root fusion with the aid of laser welding.

Figure 25:
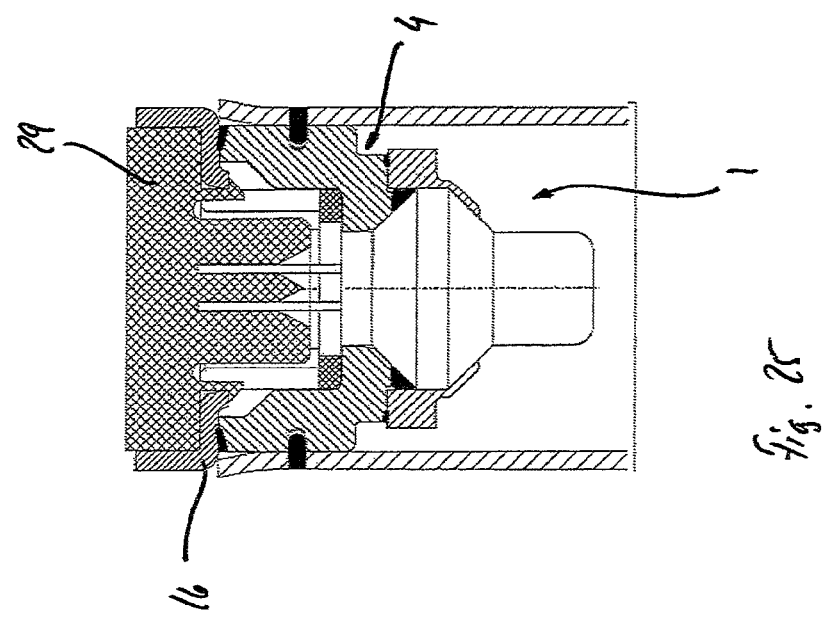
FIG. 25 shows an igniter unit including an igniter carrier, which has an angled plate for guiding a plug.

FIG. 25 shows an igniter unit 1 including an igniter carrier 4, which has an angled plate based on orientation ring 16, which guides a plug 29 and protects the same from being twisted off.

Figure 26:
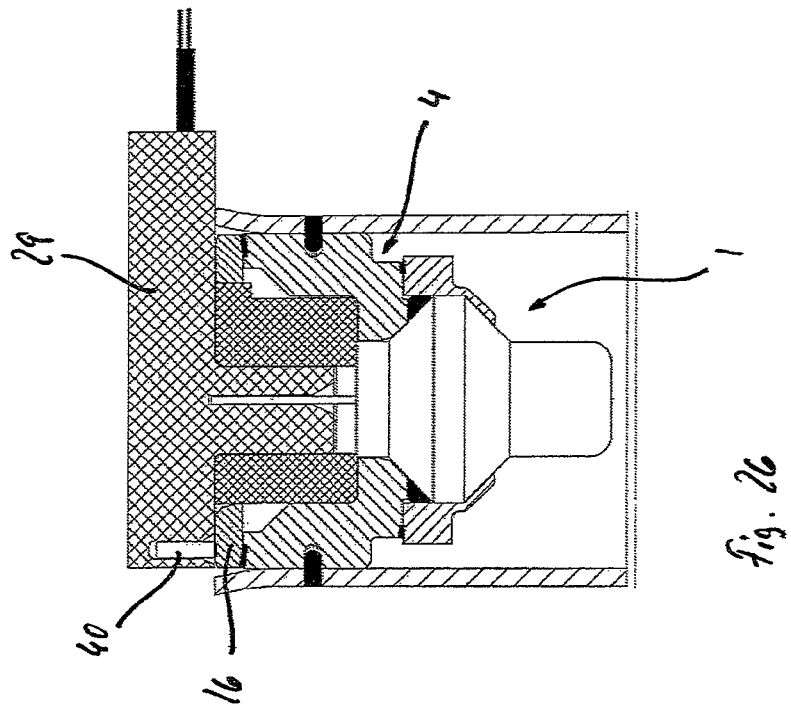
FIG. 26 shows an igniter unit including an igniter carrier, which has a pin for guiding a plug.

FIG. 26 shows an igniter unit 1 including an igniter carrier 4, which has a pin 40 for guiding a plug 29. Pin 40 is welded onto orientation ring 16 and is used for engagement into a guide hole of plug 29.

FIG. 27 shows an igniter unit 1 including an igniter carrier 4, which has an orientation ring 16 having a contoured recess 41 for the oriented accommodation of a plug 29. In this embodiment, a separate connector part is dispensed with. A short circuit spring may also be dispensed with. Recess 41 has a contour which corresponds to a negative cross-sectional contour of plug 29. FIG. 28 shows a top view onto orientation ring 16 having a recess 41, which is contoured by way of example.

In addition, reference is made in particular to FIG. 1 and FIG. 2 and the related description on a supplementary basis with regard to FIGS. 3 through 28.

LIST OF REFERENCE NUMERALS 1 igniter unit
2 igniter
2a igniter
2b igniter
3 connector part
4 igniter carrier
5 housing
6 axis of symmetry
7 connecting section
8 first accommodating section
9 second accommodating section
10 O-ring seal
11 edge section
12 contacts
13 detent hook
14 carrier
15 igniter ring
16 orientation ring
16a section
17 rest surface
18 rest surface
19 rest surface
20 extension
21 undercut
22 weld seam
23 housing section
24 rolling process
25 interior
26 forming process
27 conical surface
28 grounding terminal
29 plug
30 contact spring
31 ignition chamber
32 propellant charge
33 hook
34 chamber
35 chamber
36 carrier/igniter ring
37 edge section
38 flange ring
38 insert
40 pin
41 recess

What is claimed is:

1. An igniter unit comprising an igniter and an igniter carrier, the igniter carrier comprising:

a first accommodating section configured for contacting a first portion of an igniter;
a second accommodating section configured for surrounding a second portion of the igniter, the second portion configured for contacting a part for powering the igniter; and
a connecting section for attaching the igniter unit to a housing of a gas generator, wherein the igniter carrier is prefabricated from multiple interconnected individual parts and assemblable as one individual part of an assembly with the igniter in one assembly process, the individual parts including a first individual part including the first accommodating section and a second individual part including the second accommodating section, wherein the igniter is sealingly held on the first accommodating section of the igniter carrier with the aid of a formed edge section of the igniter carrier.

2. The igniter unit as recited in claim 1 wherein the second accommodating section is used to accommodate a connector part.

3. The igniter unit as recited in claim 1 wherein at least two of the individual parts include different materials.

4. The igniter unit as recited in claim 1 wherein at least two of the individual parts are integrally interconnected.

5. The igniter unit as recited in claim 1 wherein at least one of the individual parts is manufactured in a stamping or formed part.

6. The igniter unit as recited in claim 1 wherein at least one of the individual parts includes an insert, and part of the individual part and the insert in each case include different materials.

7. The igniter unit as recited in claim 1 wherein a third individual part of the individual parts includes the connecting section, and the third individual part has a high-strength and weldable metal material.

8. The igniter unit as recited in claim 7 wherein the metal material is stainless steel.

9. The igniter unit as recited in claim 7 wherein the first and/or second individual part includes a metal material or a plastic material.

10. The igniter unit as recited in claim 9 wherein the first and/or second individual part includes a steel or aluminum alloy.

11. The igniter unit as recited in claim 1 wherein the second individual part has a contoured recess for the oriented accommodation of a plug, the part for powering the igniter including the plug.

12. The igniter unit as recited in claim 1 further comprising an undercut section corresponding to a detent section of a connector part.

13. The igniter unit as recited in claim 1 further comprising a guide section corresponding to a guide section of a connector part.

14. The igniter unit as recited in claim 1 wherein the igniter carrier forms an ignition chamber.

15. The igniter unit as recited in claim 1 further comprising a contour section for a corresponding connector part to be joined to the connector part.

16. The igniter unit as recited in claim 1 wherein at least one of the individual parts is integratable into the housing of a gas generator.

17. The igniter unit as recited in claim 1 wherein the igniter is sealingly held on the first accommodating section of the igniter carrier further using a sealing element.

18. The igniter unit as recited in claim 1 further comprising a connector part latching the igniter carrier in a form-locked manner.

19. The igniter unit as recited in claim 1 further comprising a connector part for providing an electrical contact to the igniter carrier.

20. A gas generator comprising the igniter unit as recited in claim 1.

* * * * *